(12) United States Patent
Potier et al.

(10) Patent No.: US 12,715,574 B2
(45) Date of Patent: Aug. 25, 2026

(54) FLIGHT CONTROL ACTUATOR

(71) Applicant: Goodrich Actuation Systems SAS, Vernon (FR)

(72) Inventors: Karl Potier, Aix en Provence (FR); Jennifer Davis, Carlsbad, CA (US); Raphael Medina, Pierrefitte sur Seine (FR); Jerome Socheleau, Vernouillet (FR)

(73) Assignee: Goodrich Actuation Systems SAS, Vernon (FR)

( * ) Notice: Subject to any disclaimer, the term of this patent is extended or adjusted under 35 U.S.C. 154(b) by 0 days.

(21) Appl. No.: 18/176,599

(22) Filed: Mar. 1, 2023

(65) Prior Publication Data

US 2023/0278700 A1 Sep. 7, 2023

(30) Foreign Application Priority Data

Mar. 1, 2022 (EP) .................................... 22305232

(51) Int. Cl.
*B64C 13/38* (2006.01)

(52) U.S. Cl.
CPC .................................. *B64C 13/38* (2013.01)

(58) Field of Classification Search
CPC ........... B64C 13/38; B64C 9/02; B64C 13/30; B64C 13/24
See application file for complete search history.

(56) References Cited

U.S. PATENT DOCUMENTS 4,595,158 A * 6/1986 Robinson ................ B64C 13/36 244/223
4,773,620 A 9/1988 Seidel
5,110,072 A * 5/1992 Owl .......................... B64C 9/02 244/99.2
9,950,782 B2 4/2018 Huynh et al.
2016/0229524 A1* 8/2016 Huynh ...................... B64C 9/00
2022/0055737 A1 2/2022 Galvao et al.
2022/0194552 A1* 6/2022 Burgess .................... B64C 3/56
(Continued)

FOREIGN PATENT DOCUMENTS

CN 110562437 A 12/2019
EP 4206072 A1 7/2023
EP 4227213 A1 8/2023

OTHER PUBLICATIONS

Abstract for CN110562437 (A), Published: Dec. 13, 2019, 1 page.
(Continued)

*Primary Examiner* — Valentina Xavier
(74) *Attorney, Agent, or Firm* — Kilpatrick Townsend & Stockton LLP

(57) ABSTRACT

A wing panel actuator assembly includes: an actuator housing; an actuator piston arranged in the actuator housing and axially movable relative to the actuator housing; a connecting rod attached, at one end, to an end of the piston extending from the actuator housing; the actuator housing and piston arranged to be accommodated inside a movable panel of an aircraft wing. The connecting rod is arranged to be attached, in use, at its end opposite the one end attached to the piston, to a wing structure of the aircraft wing, the panel being pivotable about a pivot point P relative to the wing structure by means of the actuator piston.

7 Claims, 5 Drawing Sheets

(56) References Cited

U.S. PATENT DOCUMENTS

| | | | | |
|---|---|---|---|---|
| 2023/0257107 | A1* | 8/2023 | Davis | B64C 13/40 244/99.5 |
| 2023/0382516 | A1* | 11/2023 | Andreani | B64C 9/18 |

OTHER PUBLICATIONS

European Search Report for Application No. 22305232.5, mailed Aug. 1, 2022, 13 pages.

European Office Action for Application No. 22305232.5, mailed Nov. 19, 2024, 6 pages.

* cited by examiner

FLIGHT CONTROL ACTUATOR

CROSS-REFERENCE TO RELATED APPLICATIONS

This application claims priority to European Patent Application No. 22305232.5 filed Mar. 1, 2022, the entire contents of which is incorporated herein by reference.

TECHNICAL FIELD

The present disclosure is concerned with a flight control actuator arranged to control a flight control surface relative to an aircraft wing structure.

BACKGROUND

Large aircraft are typically provided with moveable flight control panels or ailerons hingedly mounted to the aircraft wing structure such that the flight control panels can be raised or lowered relative to the wing structure to create different aerodynamic conditions so as to control the speed of the aircraft. The flight control panel is moved relative to the wing structure by means of an actuator. Conventionally, hydraulic actuators have been used, but in more recent times, some hydraulic actuators are being replaced by different types of actuator e.g. electrohydraulic actuators, or electrical actuators. Typically, the actuator is attached between two bearings; one attaching the actuator housing to the wing structure, and the other attaching an actuator piston to the panel. The actuator piston can be controlled to extend or retract relative to an actuator housing or cylinder which, due to the bearing attachments, causes movement of the panel relative to the wing structure about a pivot point. The kinematic associated with the control is a triangle defined by the bearing points and the pivot point, one side of which (i.e. between the bearing points) is controlled. Conventionally, the actuator housing is provided inside the wing structure, with only the end of the piston and its bearing provided at the panel. More and more aircraft are now being designed to have so-called ‘thin wings’ which have less space to house the actuator. Different types of actuator or different ways of attaching the actuators to the wing structure are, therefore, having to be considered to provide the required flight control panel control with such thin wings.

There is, therefore, a need for a new actuator design.

SUMMARY

According to the present disclosure, there is provided a wing panel actuator assembly comprising: an actuator housing; an actuator piston arranged in the actuator housing and axially movable relative to the actuator housing; a connecting rod attached, at one end, to an end of the piston extending from the actuator housing; the actuator housing and piston arranged to be accommodated inside a movable panel of an aircraft wing, the connecting rod arranged to be attached, in use, at its end opposite the one end attached to the piston, to a wing structure of the aircraft wing, the panel being pivotable about a pivot point P relative to the wing structure by means of the actuator piston.

BRIEF DESCRIPTION OF DRAWINGS

Examples of the actuator arrangement of the present disclosure will now be described with reference to the drawings. It should be noted that these are examples only, with the scope of the invention being defined by the claims. In the drawings:

DETAILED DESCRIPTION

Figure 1A:
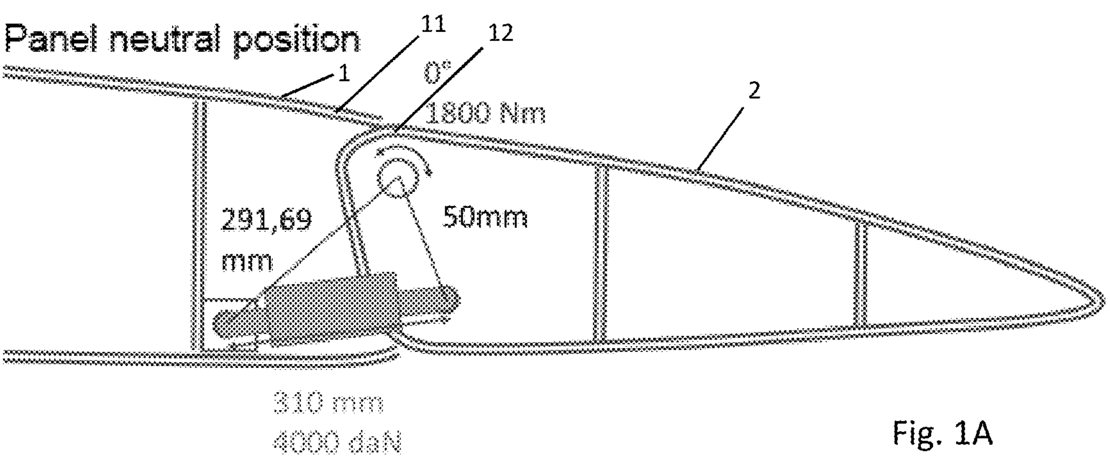
FIGS. 1A, 1B and 1C show a conventional wing/panel/actuator configuration in, respectively, the panel neutral position, the panel extended position and the panel retracted position.
Figure 1B:
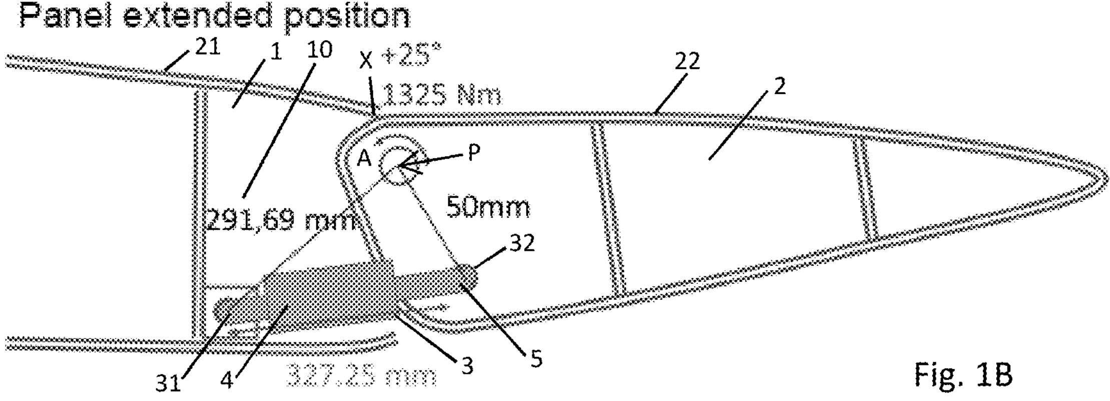
Figure 1C:
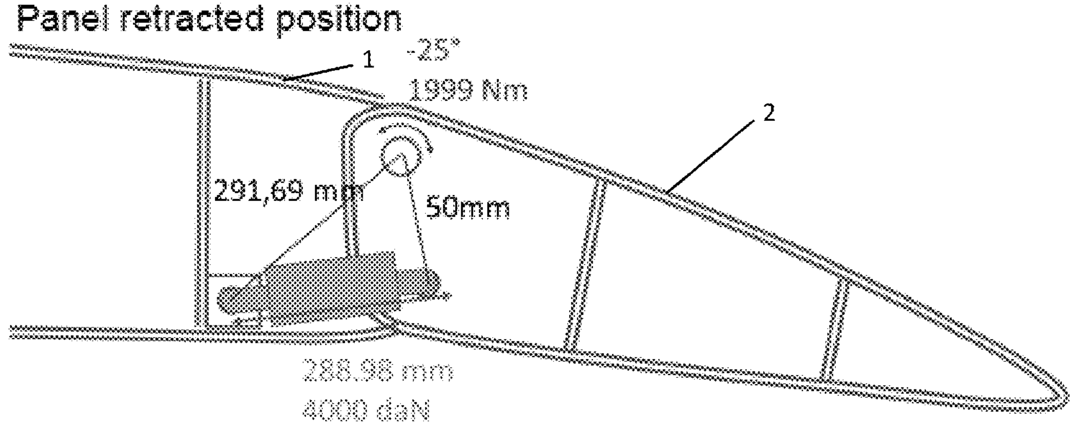

The conventional wing/actuator configuration will first be briefly described, with reference to FIGS. 1A to 1C, by way of introduction and background.

FIGS. 1A, 1B and 1C show a simple view of a classical aircraft wing and moveable panel configuration. Part of the wing surface is indicated by reference numeral 1. A moveable panel or flight control surface 2 is mounted to the wing so as to be able to pivot relative to the wing surface 1. Depending on the required flight conditions, the panel 2 may have a neutral position relative to the wing surface 1 as shown in FIG. 1A. During different phases of flight, it is desirable to vary the aerodynamic shape of the overall wing structure by pivoting the panel 2 upwards—i.e. to extend the panel relative to the wing surface as shown in FIG. 1B or to pivot the panel 2 downwards—i.e. retract the panel relative to the wing surface as shown in FIG. 1C. The panel pivots about a hinge position X when the panel and the wing surface meet. The movement of the panel 2 relative to the wing surface is controlled e.g. by the pilot from the flight deck or cockpit, by send a signal to control an actuator 3 connected between the wing surface and the panel 2 to move the panel relative to the wing surface.

The actuator 3 typically comprises an actuator housing 4 or cylinder within which is mounted an axially movable piston 5. A first end 31 of the actuator is mounted e.g. via a bearing (not shown) to the wing surface 1, inside the wing. One (first) end of the piston (not shown) is mounted in the housing. The opposite (or second) end 32 of the piston 5, protruding out of the housing, is mounted to the panel 2 (again possibly by means of a bearing which is not shown). Typically, the wing structure is a relative large hollow structure that tapers towards the trailing edge side of the wing. The wing structure, at the hinge with the panel, defining a wing cavity 10 in the area of the hinge with the panel, this cavity typically being large enough to allow the actuator housing 4 to be easily mounted and contained therein. Only the second end 32 of the actuator piston extends beyond the wing cavity 10 to attach to the panel 2.

In the neutral position (FIG. 1A) the piston is at its axial zero or neutral position relative to the housing 4 and the outer surfaces 11, 21 of the wing surface and the panel essentially form a continuous line or profile.

To extend the panel 2, as shown in FIG. 1B, the actuator is controlled such that the piston extends axially relative to the actuator housing. Because the second end 32 of the piston is attached to the panel 2, extension of the piston causes the panel to pivot in the direction of arrow A about pivot point P. Thus the top surface 22 of the panel 2 pivots about point P relative to the wing structure 1 so that the top surface 22 of the panel forms an angle 21 with the top surface of the wing structure 1 with respect to the axis of the wing structure. The example in FIG. 1B defines an angle of around 25 deg. but this I clearly only an example.

To retract the panel 2 relative to the wing structure 1, as shown in FIG. 1C. the actuator is control such that the piston retracts axially with respect to the housing. Again, as end 32 is fixed to the panel, retraction of his end of the piston towards the actuator housing draws the panel 2 downwards about the pivot point P, relative to the wing structure, in the example shown by 25 deg. relative to the wing axis. Again, however, the degree of pivot is just one possible example.

FIGS. 1A, 1B and 1C show the triangular kinematic defined by the two ends of the piston and the pivot point P. The distance between the pivot point and the first end of the actuator is fixed and the distance between the pivot point and the second end of the piston is fixed (examples are shown in the drawings but these are merely possible values. Any distances could be used within the principles described. The variable is the length between the bearing points as the piston retracts or extends relative to its neutral or zero position.

While such conventional actuator configurations work well, there is now a move, in some areas, to the use of so-called 'thin wing' aircraft in which the degree of taper across the wing towards to tip is not so great and the wing structure is overall much thinner. Such thin wings do not, therefore, define an interior volume or cavity of sufficient size to accommodate the type of actuator usually used to extend and retract the wing panels as described above. Also, because the wing is thinner, the fuel tank in the wing needs to extend over a greater area to contain the same amount of fuel and then comes close to the trailing edge. This leaves less room close to the trailing edge for the actuator.

The configuration of the present disclosure aims to provide an arrangement which enables an actuator to be provided on a thin wing aircraft to control the movement of flight control surfaces or panels.

The solution provided by this disclosure is to mount the actuator substantially on the panel 2' rather than in the wing structure 1'. This solution, and examples of how this may be realised, will be described further with reference to FIGS. 2A-C, 3A to C, and 4 to 7.

Figure 2A:
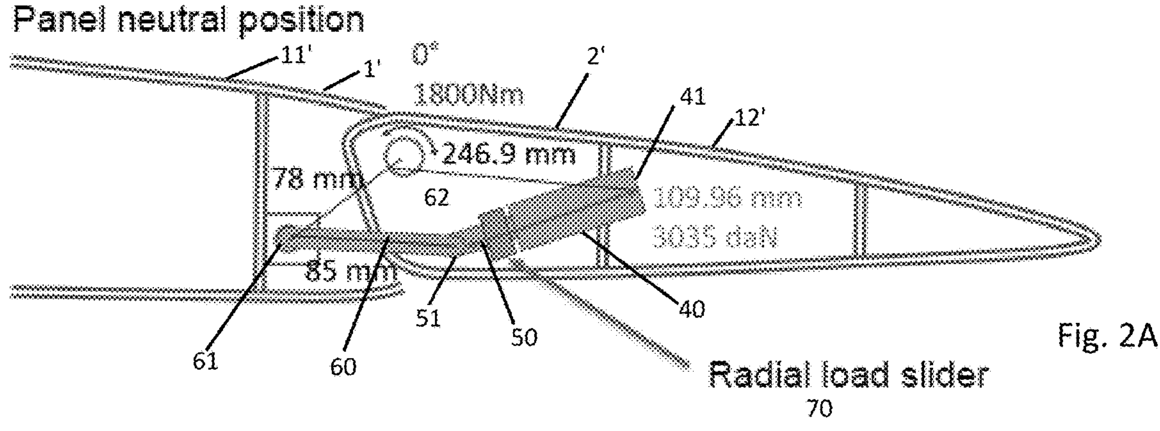
FIGS. 2A, 2B and 2C show a wing/panel/actuator configuration according to an embodiment of the disclosure in, respectively, the panel neutral position, the panel extended position and the panel retracted position.
Figure 2B:
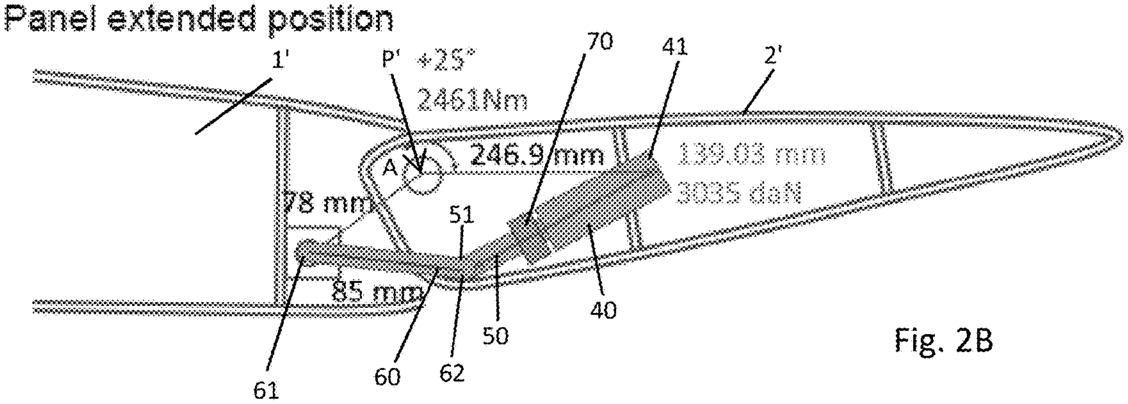
Figure 2C:
Figure 2C:
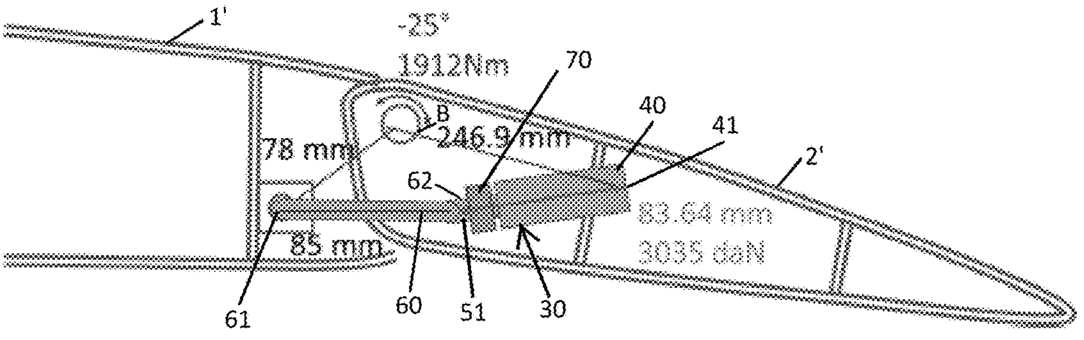

A first example is shown in FIGS. 2A to 2C. The arrangement includes an actuator 30 having a housing 40 and a piston 50 mounted within the housing for axial movement relative to the housing. An end 41 of the housing 40 is affixed to a surface of the panel 2' within the envelope of the panel. The piston 50 has a first end (not shown) within the housing 40 and a second end 51 extending out of the housing 40. A connecting arm or connecting rod 60 connects the panel mounted actuator to the wing structure 1'. The connecting rod 60 has a first end 61 fixedly mounted to a surface of the wing structure 1' e.g. by means of a bearing. The other, second, end 62 of the connecting rod 60 is attached to the second end 51 of the piston again e.g. by means of a bearing. The end of the piston and the end of the connecting rod are fixed to each other and attached to the panel e.g. by a bearing. The connecting rod 60 is a rigid part of fixed length (the dimensions shown in the figures are merely examples and any dimensions could be used within the principles described).

When the panel 2' is to be in the neutral position with respect to the wing structure as shown in FIG. 2A, and as described above, the actuator is controlled such that the piston 50 is in its zero axial position relative to the housing 40. The zero position and resulting position of the second end of the piston, which is connected to the connecting rod 60, and the length of the connecting rod, are such that the panel is flat with respect to the wing—i.e. the top surface 12' of the panel and the top surface 11' of the wing structure 1' form a substantially continuous linear surface across the entire wing.

To extend or lift the panel with respect to the wing structure, as shown in FIG. 2B, the actuator is control to cause the piston to extend axially with respect to the housing, i.e. the second end 51 of the piston extends axially further out of the housing 40. As this end 51 of the piston is attached to the connecting rod 60 second end 62, and the first end 61 of the connecting rod is fixed to the wing structure, as the piston extends from the housing, by virtue of being attached to the connecting rod which is attached to the wing structure and the panel, it forces the panel to pivot upwards, in the direction of arrow A' about pivot point P' to the extended position (see above for further details of this position).

To lower or retract the panel relative to the wing structure, as shown in FIG. 2C, the actuator is controlled such that the piston retracts into the housing, which accordingly causes the panel 2' to pivot about point P' in the direction of arrow B relative to the wing structure 1'.

As can be seen, the actuator parts are located in the panel and only the connecting rod needs to be attached in the wing structure, and so can be easily accommodated into a thin wing.

The kinematics are now defined as a four point shape between the pivot point P', the first end 41 of the housing 40, the connecting point between the second end 51 of the piston 50 and the second end 62 of the connecting rod 62, and the first end 61 of the connecting rod. The length between the pivot point at the first end of the housing stays constant, the length between the pivot point and the first end of the connecting rod stays constant and the length of the connecting rod is constant. The variable is the extension of the piston which varies the length between the first end of the housing and the second ends of the piston and the connecting rod.

In this configuration, the actuator is subject to transverse or radial loads due to being located in the movable panel 2'. To avoid such loads affecting the actuator, the arrangement is provided with a slider 70 is provided on the actuator on the panel. The connection between the piston and the slider 70, as described further below, is designed to reduce or avoid radial loads on the piston. The slider allows for radial movement between the piston and the housing to compensate for the radial forces acting on the panel.

The slider arrangement will be described further, below, in particular with reference to FIGS. 4 to 7.

Figure 3A:
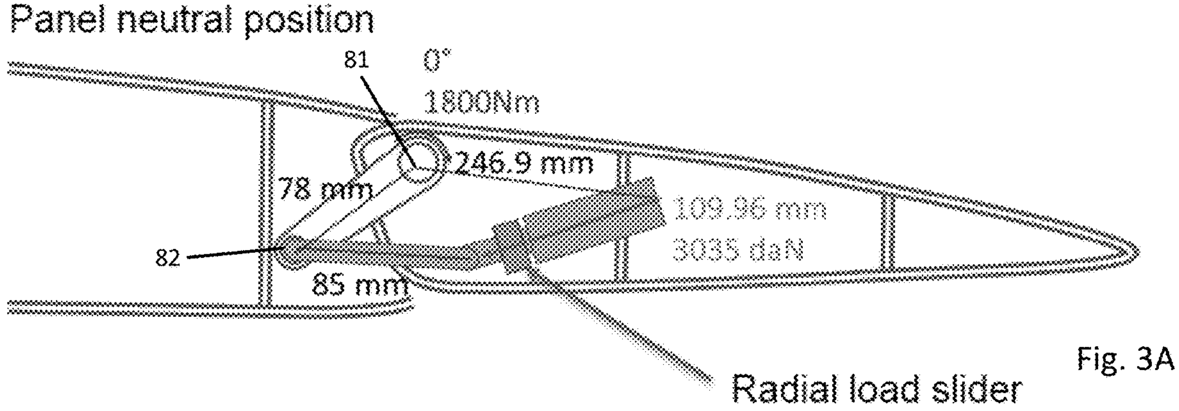
FIGS. 3A, 3B and 3C show a wing/panel/actuator configuration according to another embodiment of the disclosure in, respectively, the panel neutral position, the panel extended position and the panel retracted position.
Figure 3B:
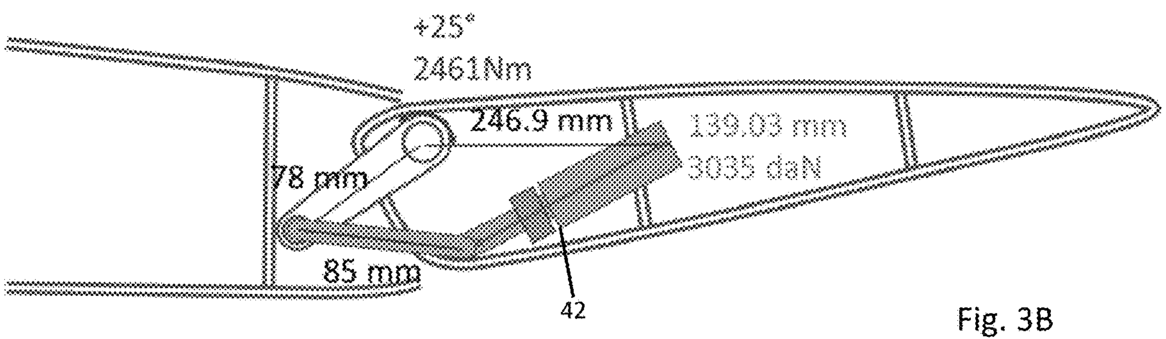
Figure 3C:
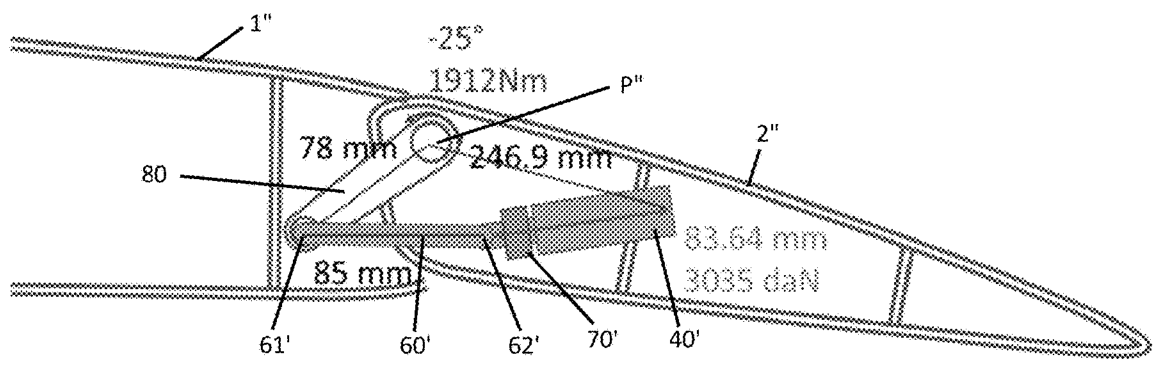

First, however, a second embodiment of the arrangement will be described with reference to FIGS. 3A to 3C.

In this embodiment, the arrangement is substantially the same as the embodiment shown in FIGS. 2A to 2C and described above. In addition to the actuator, piston and connecting rod, however, in this example, a reaction link 80 is provided between the first end 61' of the connecting rod 60' and the pivot point P''. In this embodiment, the reference numbers used are the same as for the embodiment of FIGS. 2A to 2C except for the addition of a '. The operation of the assembly is essentially as described above in relation to FIGS. 2A to 2C. The inclusion of the reaction link 80, however, relieves the wing structure, or at least the rear space of the wing structure, of stress due to loads on the wing structure, since loads from the actuator structure are not directly applied to the wing structure. One end 81 of the reaction link 80 is attached to the pivot point P''. The other end 82 is attached to the first end 61' of the connecting rod 60'.

Figure 5:
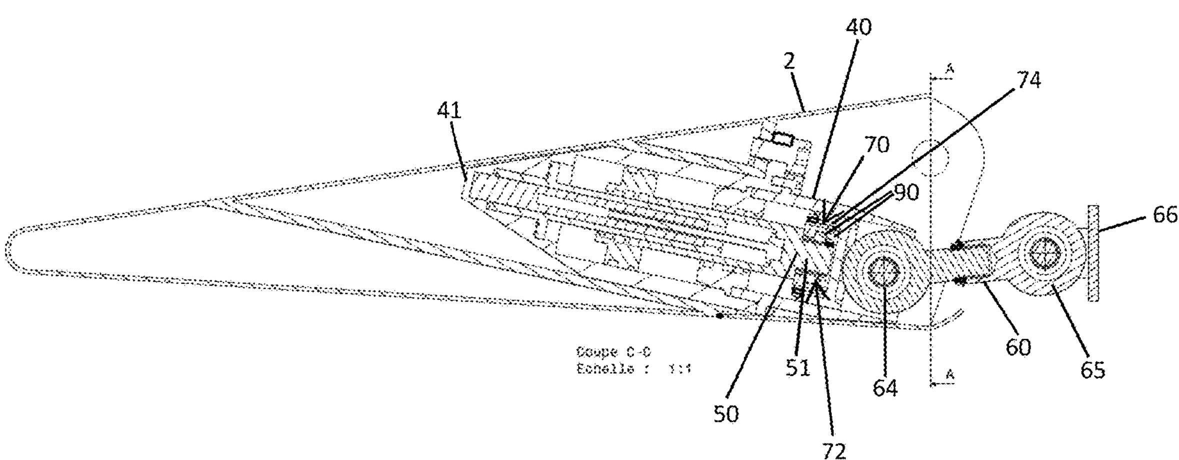
FIG. 5 is a sectional view of an actuator according to the disclosure mounted in a panel.
Figure 6:
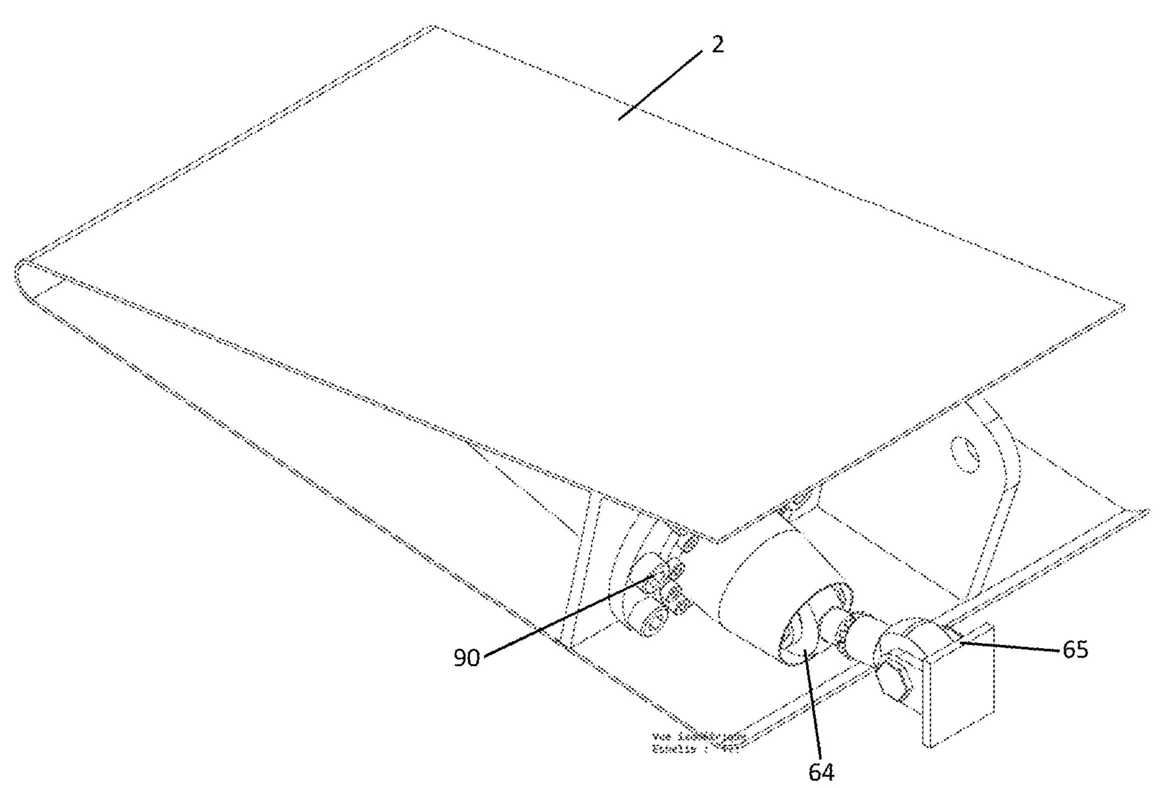
FIG. 6 is a perspective view of the arrangement of FIG. 5.
Figure 7:
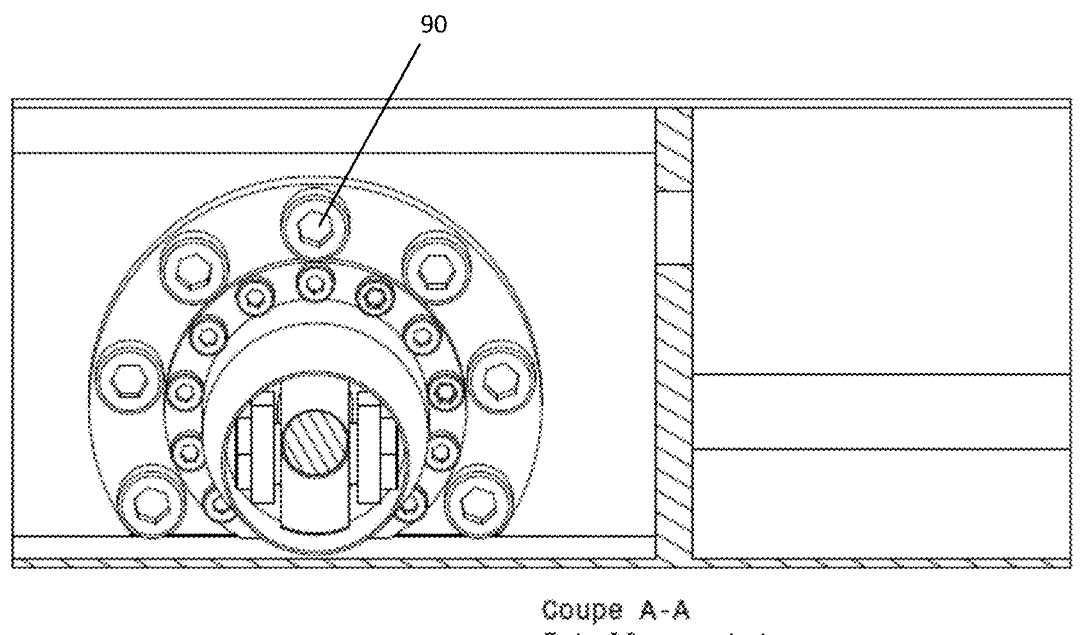
FIG. 7 is a cross section A-A of FIG. 6.

FIGS. 5, 6 and 7 show how, in one example, the actuator assembly is arranged with the actuator components all within the panel 2 and only the end of the connecting rod 60 extending from the panel and arranged to be attached to the wing structure. In FIG. 5, the attachment bearings 64, 65 mentioned above are shown.

Figure 4:
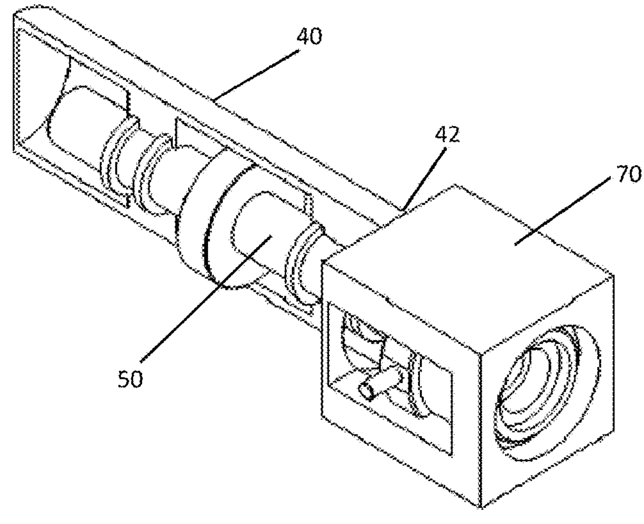
FIG. 4 is a perspective view of a part of an actuator according to the disclosure.

The feature of the slider to compensate for radial loads will be described more with reference to FIGS. 4, and 5. FIG. 4 shows the actuator 40 mounted inside the panel 2, in the retracted state. The piston rod 50 is shown in the piston housing 40. The slider 70 is mounted around the piston rod 50 at the end 51 of the piston, where the piston connects to the connecting rod 60, by means of nuts 90. The load mostly goes through the axis 60. The nuts are used mainly to ensure the precise amount of backlash required to meet backlash requirements while still allowing a small relative motion between the piston 50 and the connecting rod 60. The slider 70 provides guidance of the piston and allows for some relative sliding movement between the piston rod and the connecting part and the housing.

As seen in FIG. 5, the nuts 90 are used to control a gap 72 between the slider connecting part 74 and the piston rod 50. The gap should be small enough to meet backlash requirements, but large enough to allow radial motion between the piston rod 50 and the connecting rod 60. The slider connecting part 74 is attached to the connecting rod 60 and is arranged to slide inside the actuator body.

The arrangement according to this disclosure is particularly advantageous in that it is accommodated in the movable panel rather than in the wing structure and so can easily be used with thin wing aircraft. Being arranged in the panel allows for longer lengths of actuator piston and this greater stroke and less load for a given panel motion and torque, and allows optimisation of the kinematics of the arrangement. Because loads are reduced, the actuator power requirements may be less, this allowing the actuator to be generally smaller than convention actuators. In the embodiment using a reaction link, there are no loads inside the wing structure. A further advantage is that it is possible to provide the structure in the form of a panel within which the actuator is already mounted, with an interface 66 for attachment of the complete unit to an aircraft wing structure. This means that the panel/actuator unit can be manufactured and sold separately for use by aircraft manufacturers.

The invention claimed is:

1. An aircraft wing assembly comprising:
a wing structure;
a movable panel pivotally connected to the wing structure; and
a wing panel actuator assembly comprising:
an actuator housing;
an actuator piston arranged in the actuator housing and axially movable relative to the actuator housing;
a connecting rod having a first end and second end, wherein the first end is attached to an end of the piston extending from the actuator housing; and
a slider component at the end of the actuator from which the piston extends and within which the piston is received such that radial movement is permitted between the piston and the housing;
wherein the actuator housing and the actuator piston are accommodated inside the movable panel of the aircraft wing assembly,
wherein the second end of the connecting rod is attached directly to the wing structure of the aircraft wing assembly, the moveable panel being pivotable about a pivot point P relative to the wing structure by means of the actuator piston, wherein the pivot point P is within the movable panel.

2. The assembly of claim 1, wherein the connecting rod is a rigid rod of predetermined length.

3. The assembly of claim 1, wherein first end of the connecting rod and the end of the piston are affixed to the moveable panel by means of a bearing.

4. The assembly of claim 1, further comprising:
a reaction link between the end of the connecting rod that is attached to the connecting rod and a pivot point (P).

5. The assembly of claim 4, wherein the reaction link is attached to the connecting rod and the pivot point by a bearing.

6. An aircraft wing panel comprising:
a panel interior; and
a wing panel actuator assembly as claimed in claim 1;
wherein the actuator housing is located within the panel interior.

7. The aircraft wing panel of claim 6,
wherein the panel interior has an open side and a trailing edge, and
wherein the actuator assembly is located with the housing in the interior such that the connecting rod extends from the open side to be attached to a wing structure, in use.

* * * * *